UNITED STATES PATENT OFFICE.

WILHELM WOHLTMANN, OF NEW YORK, N. Y.

CATARRH REMEDY.

SPECIFICATION forming part of Letters Patent No. 276,119, dated April 17, 1883.

Application filed February 6, 1883. (Specimens.)

*To all whom it may concern:*

Be it known that I, WILHELM WOHLTMANN, of the city, county, and State of New York, have invented certain new and useful Improvements in Catarrh Remedies, of which the following is a specification.

The object of this invention is to furnish an improved remedy for catarrhal affections of the interior mucous membranes of the nose, mouth, and ears; and the invention consists of a solution of carbonate of soda, salt, and sugar in water, which is prepared in the following manner: Carbonate of soda, salt, and sugar, in equal parts, are singly dissolved and thoroughly mixed, about one-half a pound of each in one gallon of water. For children's use a larger quantity of water may be used, so as to make the solution weaker. The solution is used either as a gargle or is injected by a syringe, as the case may be, the repeated use of the solution removing the irritation from the affected parts and tending to restore the healthy tone of the same. It also assists in dissolving and throwing out obstructions of the parts mentioned.

Having thus described my invention, I claim as new and desire to secure by Letters Patent—

A catarrh remedy consisting of an aqueous solution of carbonate of soda, salt, and sugar, prepared substantially as set forth.

In testimony that I claim the foregoing as my invention I have signed my name in presence of two subscribing witnesses.

WILHELM WOHLTMANN.

Witnesses:
   CARL KARP,
   SIDNEY MANN.